United States Patent
Gadre et al.

(10) Patent No.: US 7,165,128 B2
(45) Date of Patent: Jan. 16, 2007

(54) MULTIFUNCTIONAL I/O ORGANIZER UNIT FOR MULTIPROCESSOR MULTIMEDIA CHIPS

(75) Inventors: Shirish Gadre, San Jose, CA (US); Elif Albuz, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 890 days.

(21) Appl. No.: 09/864,725

(22) Filed: May 23, 2001

(65) Prior Publication Data
US 2002/0184450 A1    Dec. 5, 2002

(51) Int. Cl.
*G06F 3/00*    (2006.01)

(52) U.S. Cl. .............................. 710/52; 710/8; 710/104; 710/260; 712/32; 712/35; 712/225

(58) Field of Classification Search ............ 710/52–57, 710/260–269, 8, 104; 709/213–216; 712/32, 712/35, 225
See application file for complete search history.

(56) References Cited

U.S. PATENT DOCUMENTS

| | | | | |
|---|---|---|---|---|
| 4,386,402 A | * | 5/1983 | Toy ............................... | 711/3 |
| 5,841,988 A | * | 11/1998 | Chennubhotla et al. ..... | 709/237 |
| 5,892,966 A | * | 4/1999 | Petrick et al. ................. | 712/36 |
| 5,943,509 A | * | 8/1999 | Hori ............................. | 710/54 |
| 6,148,348 A | * | 11/2000 | Garnett et al. ................. | 710/14 |
| 6,219,690 B1 | * | 4/2001 | Slingwine et al. .......... | 718/102 |
| 6,347,344 B1 | * | 2/2002 | Baker et al. ................... | 710/20 |
| 6,711,651 B1 | * | 3/2004 | Moreno et al. .............. | 711/141 |

* cited by examiner

*Primary Examiner*—Tammara Peyton
*Assistant Examiner*—Eron Sorrell

(57) ABSTRACT

An apparatus and method for providing enhanced performance for multi-processor multimedia chips. In one embodiment, the present invention is comprised of a data and communication apparatus coupled with the multimedia system in which the multi-processor multimedia chips are disposed. The present invention is comprised of a data memory to retrievably store data. The present invention is further comprised of an instruction memory to retrievably store instructions. The present invention is also comprised of an incoming buffer which permits transfer of data into the data and communication apparatus and provides fast access to streaming data. The present invention is additionally comprised of an outgoing buffer which monitors and permits transfer of data out of the data and communication apparatus.

24 Claims, 7 Drawing Sheets

MULTIFUNCTIONAL I/O ORGANIZER UNIT FOR MULTIPROCESSOR MULTIMEDIA CHIPS

FIELD OF THE INVENTION

The present invention relates to the processing of various types of multimedia data. More particularly, the present invention provides a apparatus for processing multimedia data for computer systems and other digital devices having multi-processor shared memory multimedia chips, e.g., systems on a chip or systems having embedded configurations.

BACKGROUND OF THE INVENTION

Continuing advances in technology with regard to digital electronics and digital computer systems have created new categories of digital electronic systems and their associated products. These advances have also been instrumental in the development of digital communication and the use of digital information in a digital broadcast system. Further, digital communication is becoming as commonplace as analog communication as a communication medium.

Digital communication systems include multimedia computer systems, direct broadcast digital satellite systems, interactive World Wide Web access systems, and digital cable systems. Digital communication provides a number of advantages to users, such as superior audio and video quality, compatibility with computers and the Internet, and consistency of reception over varying distances. Furthered by the development and acceptance of digital communication, other products to be implemented in conjunction with the new communication medium have also been developed. In addition to multimedia computer systems and digital television, another product developed for use with the new television medium is the intelligent transceiver, commonly referred to as a digital terminal device or a set top box.

Within the multimedia computer system, digital television, or the intelligent set-top box, information and instructions associated with receiving and processing digital communication signals are stored in memory units within the system or device and executed by a processor.

The multimedia computer system, digital television or set-top box performs a number of functions associated with processing a digital communication signal. Typically, the received digital signal is encoded, and the signal is decoded by the computer system, television or set top box before further processing occurs. The digital signal is typically in a compressed data format such as a MPEG (moving picture experts group) for video signals and/or Dolby AC3 signals for audio signals, and so the received digital signal is decoded (decompressed) by the computer system, digital television, the set top box; or other appropriate device. After decoding, the audio content and the video content contained in the digital signal are processed so that it can be viewed and/or listened to by a user using, for example, a television set, or a multimedia computer system.

For each of the processes, related to the processing of the received signals by the computer system, television, set top box, or other related device, there is a core. For example, there is a decode core, a multiplexer core, a display core, a video core, an audio core, and numerous others. For the device to process, for example, the audio signal, that portion is processed by the audio core, and likewise the video signal is processed by the video core, etc.. When, for example, the audio core and the video core are each processing their specific data, this causes multiple accesses to the resources within the device, e.g., memory, bus space, processor time, etc.. As such, a bottleneck, a sort of electronic traffic jam if you will, occurs, slowing the speed with which the device may process the data.

In one attempt to provide a solution to the problem was to provide direct access to the memory within the device. This is shown in FIG. 1 (Prior Art) as a block diagram illustrating the main components. In FIG. 1, the DSP 2 (digital signal processor) is coupled with the data memory 3, via bus 4. In this example, full memory is allocated for the variables. For instance, when utilizing an application in a DSP environment, to perform display processing, the total size of the variables and the total data size in which the system is operating must be determined, and then that amount is allocated for the processing of the data in the environment in which the system is operating. As such, each process such as, e.g., video processing or audio processing must be completed before proceeding to the next processing task, which inherently creates a processing slowdown.

Another attempt to provide a solution for the above stated problems was to provide secondary memory within the device. This is shown in FIG. 2 (Prior Art) as a block diagram illustrating the main components. In FIG. 2, the processor 5 is coupled with RAM (random access memory) 7 and cache (secondary memory) 6 via memory space (bus) 8. Cache 6 is fast access memory for frequently used data or information. Because cache 6 is disposed off chip, it is much less expensive than on chip cache, and it is very expandable. For example, if a data variable is located in cache 6, there is an immediate retrieval. Otherwise, the data variable is located in RAM 7, and as such a substantial cache miss penalty is incurred. This means that the latency of the process is increased because processor 5 first queries cache 6, and if the data variable is not located there, a cache miss is incurred due to the time required to query cache 6, before proceeding to RAM 7 to locate the data variable.

This is especially troublesome in an embedded system, such as a system on a chip where there are, as described above, multiple cores such as, e.g., the video graphics core and the audio core competing for the memory, which will also cause the slowdown of the processing. Additionally, because in most circumstances, the data is in the form of streaming data such as, for example, video frames where one frame is processed, then another, and then another, etc. where each frame is a separate graphic and process, the cache, which is for frequently used data, is relatively ineffective in the processing of streaming data.

Therefore, there exists a need for an apparatus and method for providing interprocessor communication within the multiprocessor multimedia chip. Another need exists for an apparatus and method that provides enhanced performance of the multiprocessor multimedia chip. A further need exists for an apparatus and method for enhancing the performance of data transactions with the memory and other peripherals within the system in which the multiprocessor multimedia chip is operating. Additionally, a need exists for an apparatus and method that is compatible with the existing architecture of the system in which it is disposed. The present invention provides a unique and novel solution to these and other related problems.

SUMMARY OF THE INVENTION

Accordingly, the present invention provides apparatus and method for providing enhanced performance for multiprocessor multimedia chips. In one embodiment, the present invention is a data and communication apparatus coupled with the multimedia system in which the multi-processor multimedia chips are disposed. The present invention is comprised of a data memory to retrievably store data. The present invention is further comprised of an instruction memory to retrievably store instructions. The present invention is also comprised of an incoming buffer which permits transfer of data into the data and communication apparatus and provides fast access to streaming data. The present invention is additionally comprised of an outgoing buffer which monitors and permits transfer of data out of the data and communication apparatus.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
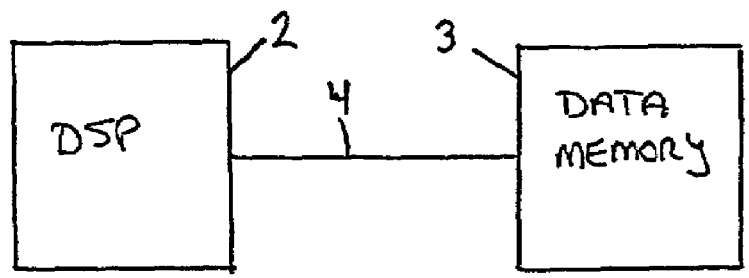
FIG. 1 is a block diagram illustration of certain components in a exemplary prior art multimedia device operating in a DSP (digital signal processor) based environment.
Figure 2:
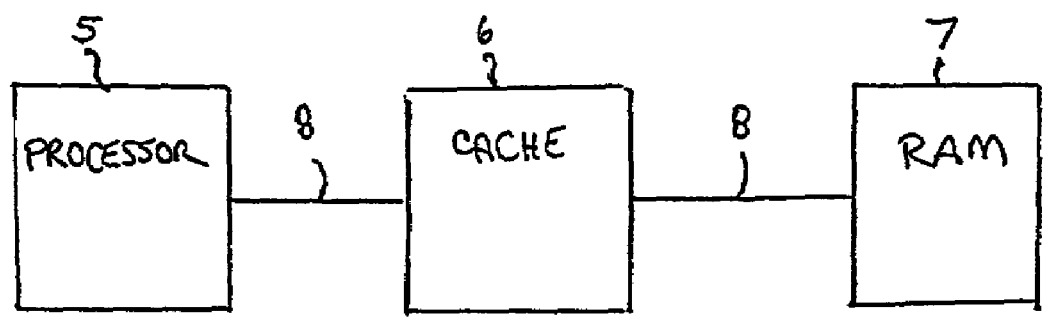
FIG. 2 is a block diagram illustration of certain components in a exemplary prior art multimedia device operating in a processor based environment.

A multifunction I/O organizer apparatus is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "indicating" or "decoding" or "receiving" or "performing" or "initiating" or "sending" or "receiving" or "accessing" or "enabling" or "processing" or "loading" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of a multi-processor multimedia chip system, such as a personal or workstation type of multimedia computer system. However, it is appreciated that the present invention can be used with other types of devices such as, e.g., a digital television or an intelligent transceiver that have the capability to process multimedia or real-time kernel thread context (streaming) data, including but not limited to multi-processor multimedia chip systems.

Figure 3:
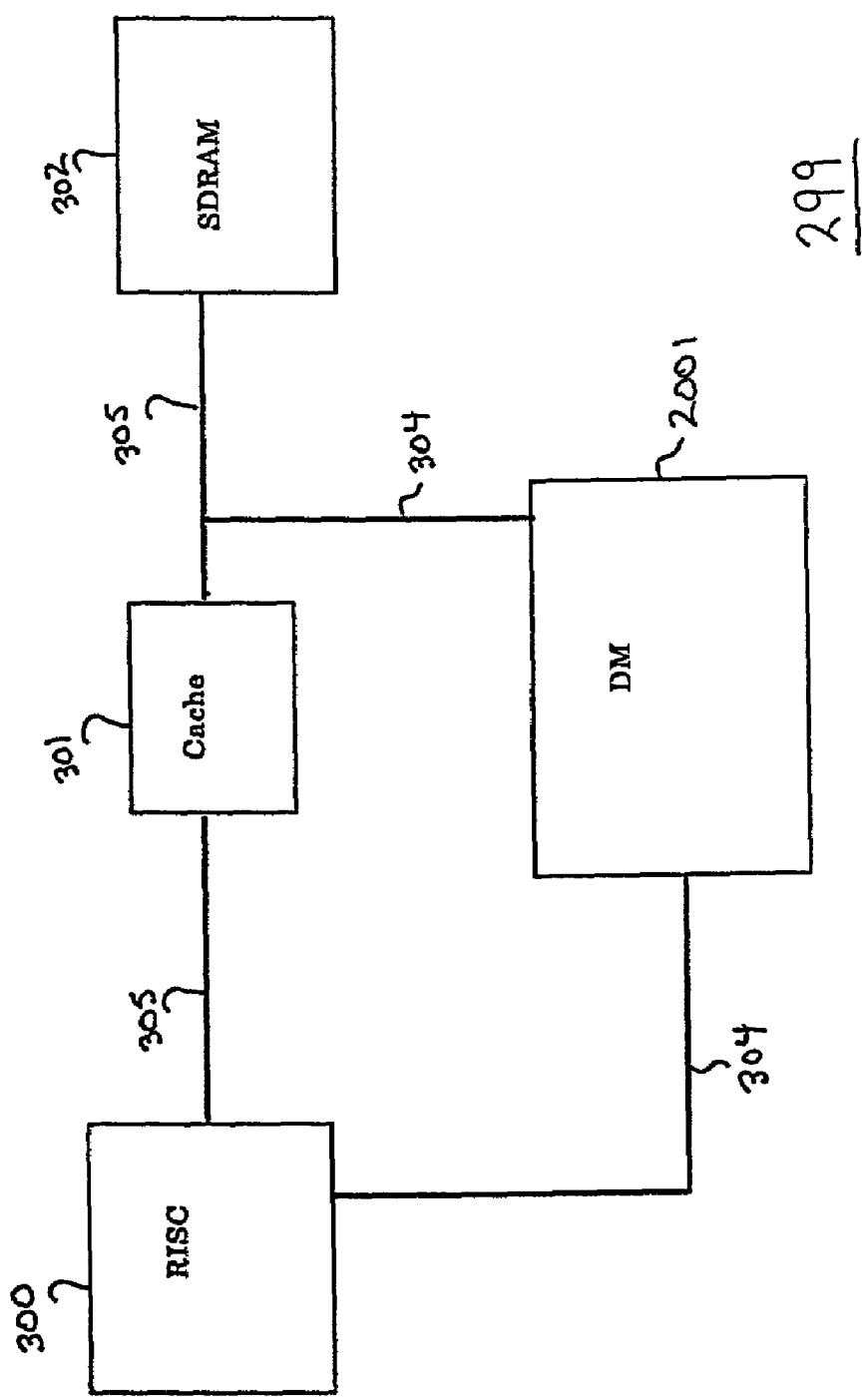
FIG. 3 is a block diagram illustration of certain components in a multimedia device having a multi-processor multimedia chip and a multifunction I/O organizer apparatus, in accordance with one embodiment of the present invention.

FIG. 3 is a block diagram illustration of certain components in a multimedia computer system 299 having a multi-processor shared memory multimedia chip and a multifunction I/O organizer unit (DM 2001), in one embodiment of the present invention. Multimedia computer system 299 comprises memory bus 305 for communicating information, I/O space (bus) 304 also for communicating information, RISC (reduced instruction set computing) processor 300, coupled to memory bus 305 and I/O space (bus) 304, for processing information and instructions, is also shown. In this embodiment, RISC processor 300 is representative of the multiple processors within the multi-processor shared memory multimedia system depicted. Cache 301 is shown and provides fast access storage for frequently used information. SDRAM 302, coupled to memory bus 304 is shown and provides storage for instructions and information for RISC processor 300. DM 2001, a multifunction I/O organizer apparatus is, in this embodiment of the present invention, shown as coupled with I/O space 304. I/O space 304 provides the communication path between the previously described components and the present invention, DM 2001. It should be appreciated that I/O space (bus) 304 is pre-existent within system 299 depicted in FIG. 3.

Still referring to FIG. 3, FIG. 3 is a new system configuration which is more suitable for a multi-processor shared memory multimedia chip systems such as, e.g., a system on a chip having embedded cores, in one embodiment of the present invention. The functional configurable architecture provides a core that can be used in an embedded system so that the system's processors don't have an exclusive right to the SDRAM, in, for example, a shared memory system configuration. It should be appreciated that the new arrangement, dependent upon the RISC core, is configured with a memory space (bus) 305 and an I/O space (bus) 304, wherein each is a different bus, such that one is for the main memory and one is for controlling registers, in this embodiment of the present invention.

Referring still to FIG. 3, the present invention is disposed within a system that is configured with RISC cores that have separate memory and I/O spaces (buses) such that it is oriented for computing real-time embedded processes. In one embodiment of the present invention, access to DM 2001, is provided by the existing I/O space (bus) 304. It should be appreciated that the I/O space (bus) 304 is a fixed protocol having a fixed cycle access such as, e.g., a two or three cycle bus access.

Figure 4:
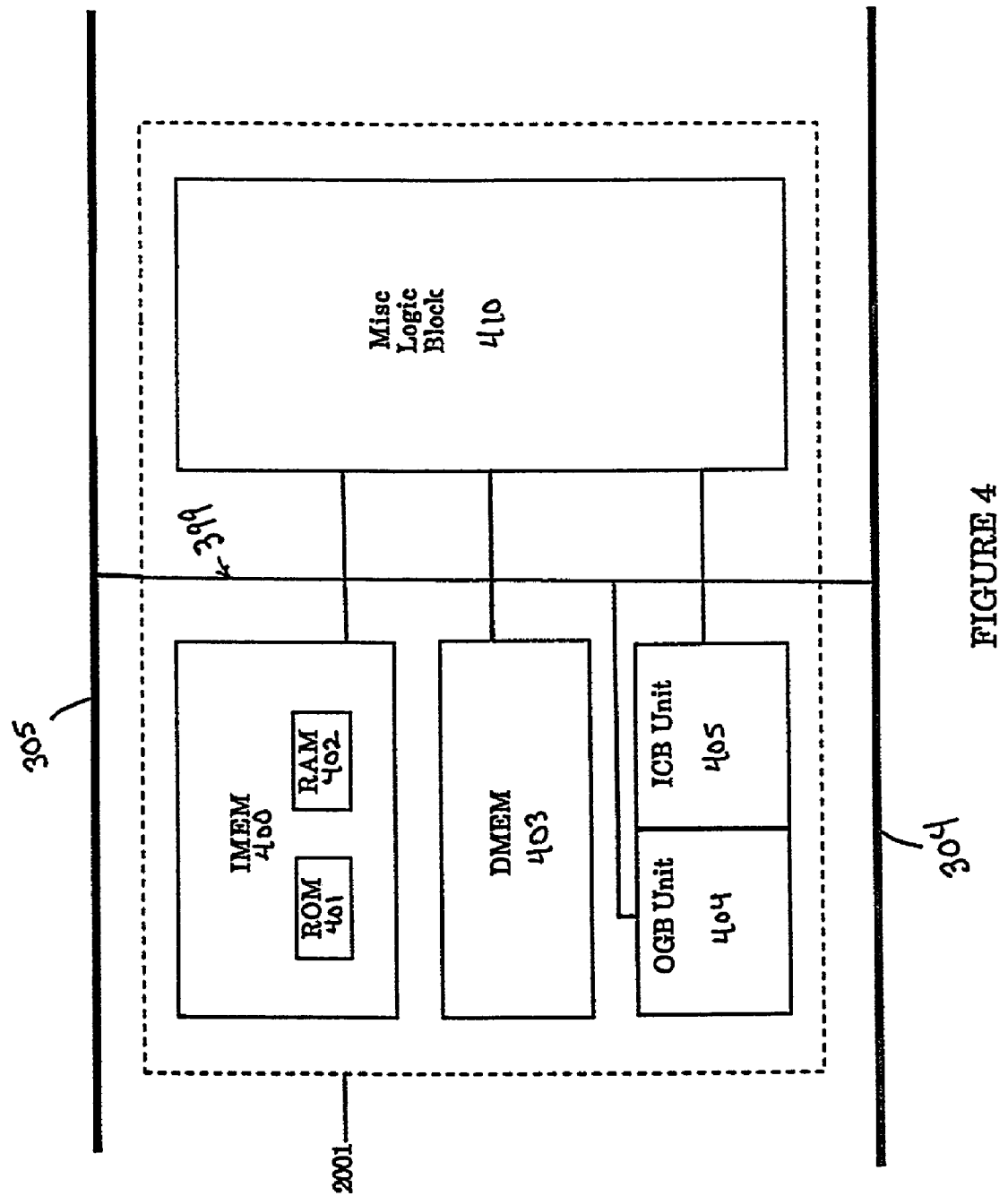
FIG. 4 is a block diagram illustration of the components that comprise the multifunction I/O organizer apparatus of FIG. 3, in accordance with one embodiment of the present invention.

FIG. 4 is a block diagram of the components that, in one embodiment of the present invention, comprise DM 2001, a multifunction I/O organizer unit, of FIG. 3. Memory space (bus) 305, analogous to memory bus 305 of FIG. 3, is shown as disposed toward the top of FIG. 4, in this embodiment of the present invention. I/O space (bus) 304, analogous to I/O space 304 of FIG. 3, is shown as disposed toward the bottom of FIG. 4, in this embodiment of the present invention. Buses 304 and 305 provided the communication pathways between the DM 2001 and system 299 of FIG. 3.

Still referring to FIG. 4, shown is DMEM (data memory) unit 403, adapted to retrievably store data. Also shown is IMEM (instruction memory) unit 400, adapted to retrievably store instructions. Shown within IMEM unit 400 is ROM (read only memory, non-volatile) 401 and RAM (random access memory, volatile) 402, both of which are adapted to store instructions and functions of a particular process. An ICB (incoming buffer) unit 405, adapted to permit transfer of data into DM 2001 while also providing fast access to streaming data, is also shown. OGB (outgoing buffer) unit 404, adapted to permit transfer of data out of DM 2001 while enabling each processor to communicate with other processors, cores, and memory disposed within system 299. Bus 399, coupled with the components of DM 2001 provides the communicative coupling of the components within the DM 2001 and buses 304 and 305. Also shown is miscellaneous logic block 410, comprised of DMA logic, host_ucode logic, Lbus interface control logic, DMEM control logic, IMEM control logic, prefetch control logic, and registers, which is adapted to provide control and configuration of the DM 2001's components contained therein.

Figure 5:
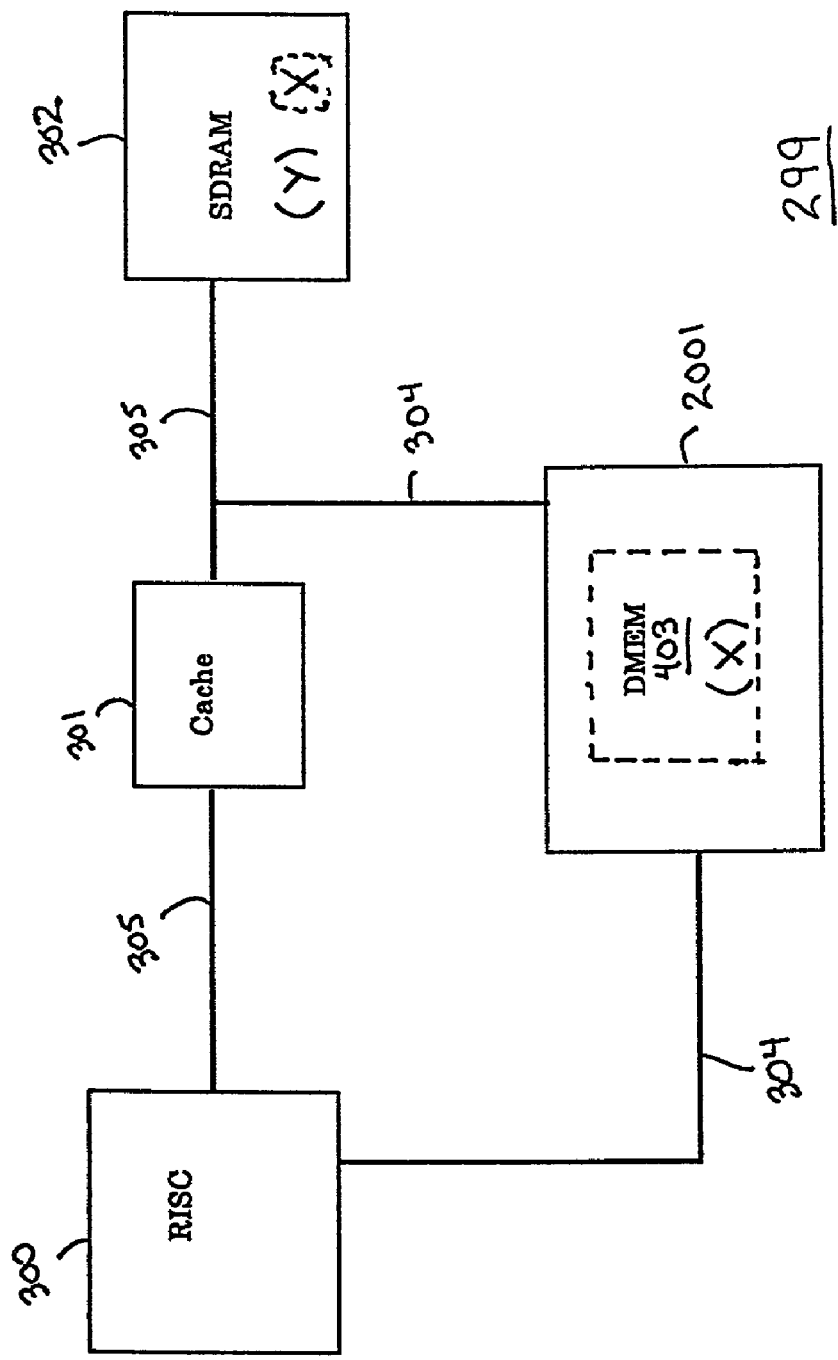
FIG. 5 is a block diagram illustration of the description and operation of the DMEM (data memory) unit, one component of the multifunction I/O organizer apparatus of FIG. 4, in accordance with one embodiment of the present invention.

FIG. 5 shows the multimedia computer system 299 of FIG. 3. Shown disposed within DM 2001 is DMEM (data memory) unit 403, as described in FIG. 4, in one embodiment of the present invention. As previously stated, in a conventional data cache system, a cache miss may result in significant delay of other critical operations. For critical memory locations that are accessed from ISRs (interrupt service routines), and other global variables, we may lock cache location so that it won't be flushed. When the amount of global variables and/or critical memory locations is large, we may end up with disabling most of the cache by locking. In that case, we do not use cache hardware. This kind of global and critical data may be stored in scratch memory with fast access within the same I/O address space. DMEM provides fast access and total software control of the data. By utilizing DMEM for all the variables used in ISR's, we may ensure the time it takes to complete the ISR. It is also advantageous to use DMEM for real-time kernel thread context data, therefore thread context switch can be achieved at a faster speed. By virtue of using DM 2001 in lieu of cache 301, and by providing access to the variables in DM 2001, through I/0 space (bus) 304, an existing direct path from RISC 300 to the DM 2001, the access to DM 2001 is from I/O space (bus) 304 and therefore not in conflict with other processes occurring in the memory space (bus) 305, cache 301, and SDRAM 302, this provides better performance predictability to be achieved.

Still with reference to FIG. 5, in one example, if a process required RISC 300 to perform a memory access, wherein the RISC 300 was looking for data (Y), RISC 300 would first query cache 301 looking for data (Y), and not finding (Y), which as previously stated is called a cache miss, would then proceed to query SDRAM 302 for data (Y). At this point, the system has a pending process, loading (Y) from the load store, load meaning that you are using the memory space (bus) to access the store, meaning system memory SDRAM 302. During this loading of (Y), an ISR (interrupt service routine) occurs, and, in this example, variable (X), shown in SDRAM 302 and indicated with a dashed bracket, is required by the ISR. Since the system has begun the load store access, getting (Y) through the memory space (bus) 305, memory space (bus) 305 is busy and is therefore blocked from accessing the variable (X) needed by the ISR. In a system where the access is via the same bus, you would need dual controllers or two load store units (memory) and then the system would be waiting for the first access, (Y), to clear before access to (X) would be granted.

Still in FIG. 5, by utilizing the function of DMEM 403 within DM 2001, which in this example is the storing of the variable (X) shown in DMEM 403 and indicated by parentheses, and the provided I/O space (bus) 304 as an access to DM 2001, that variable, (X), is no longer disposed within SDRAM 302. Now, when the ISR occurs, and the ISR needs to access variable (X), regardless of the processes pending on the memory space (bus), the variable, (X) is accessed through I/O space (bus) 304, thereby bypassing any traffic on the memory space (bus). This has some definite positive effects upon system 299. One, by relocating (X) from SDRAM 302 to DMEM 403, the memory space (bus) will be available for other system processes instead of interrupting those processes to perform the ISR. Second, because the ISR is able to access the variable (X) now disposed within DMEM 403, the time to access the variable is less contingent upon the processes performed by the system, which ensures the time needed to complete the ISR.

By providing a direct access to the DM unit, via I/O space 304, ISRs can be pre-configured into the processes as a given, thereby increasing speed with which the process can be completed, saving user time and processing energy. Additionally, this provides to a user, the choice of partitioning the ISRs into the DMEM 403 of DM 2001 or into memory space SDRAM 302, depending on the core application, which thereby allows size balancing of the memories.

Figure 6:
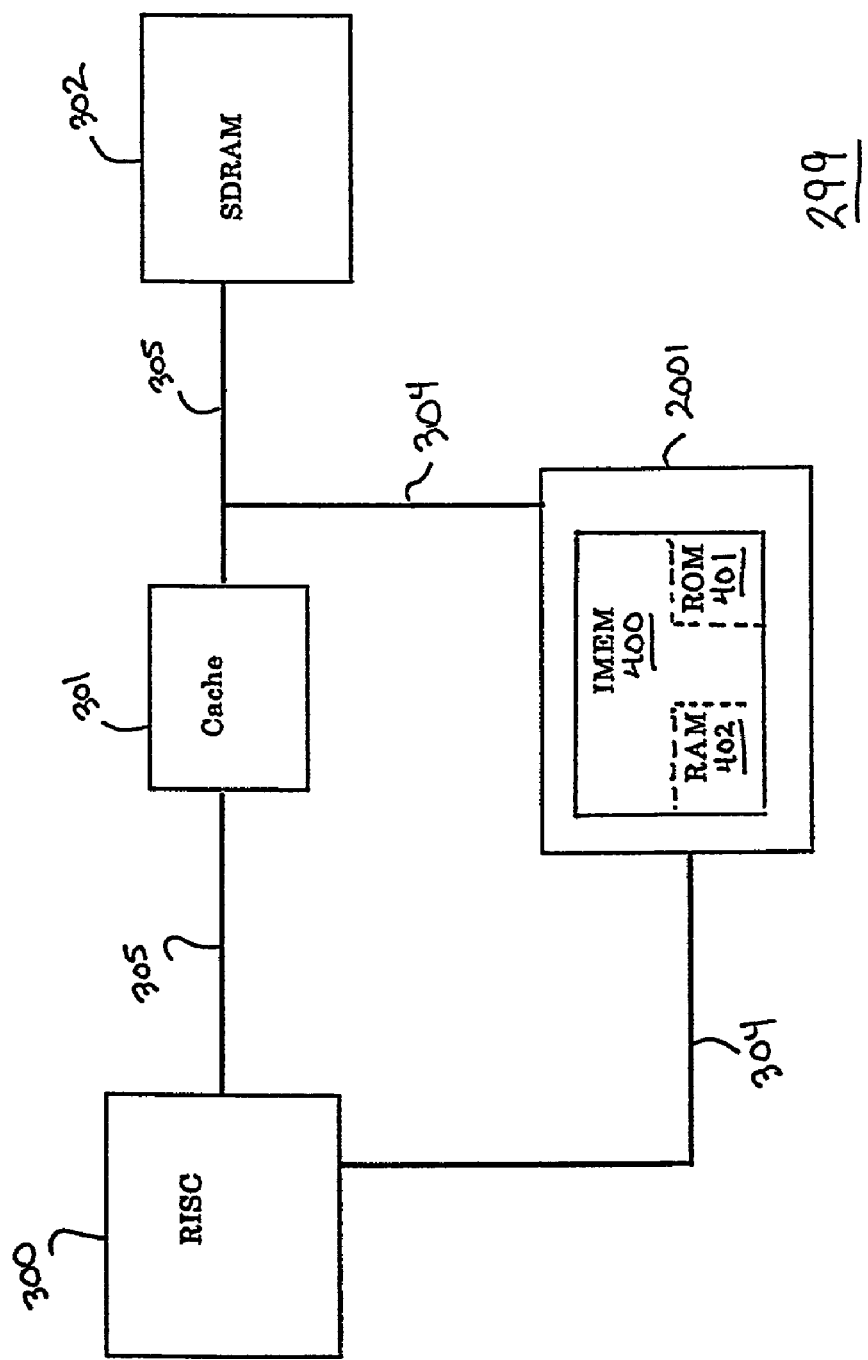
FIG. 6 is a block diagram illustration of the description and operation of the IMEM (instruction memory) unit, one component of the multifunction I/O organizer apparatus of FIG. 4, in accordance with one embodiment of the present invention.

FIG. 6 shows the multimedia computer system 299 of FIG. 3. Shown disposed within DM 2001 is IMEM (instruction memory) unit 400 and RAM 402 and ROM 401, as described in FIG. 4, in one embodiment of the present invention. The IMEM unit 400 is similar to DMEM 403 of FIG. 5, but is slightly different because IMEM 400 provides two features, prefetching of programs residing in SDRAM 302 and the partitioning of address space that contains programs residing in SDRAM 302. Because programs residing in memory have the same problems regarding the sharing of system resources, memory space (bus) 305, cache 301, and SDRAM 302, as described in the previous figures, when an instruction is not in cache, a cache miss occurs, thereby requiring the instructions to be retrieved from SDRAM 302. IMEM 400 provides a way to remove portions of the instructions, programs, or portions thereof from SDRAM 302 and disposed them within DM 2001.

Still referring to FIG. 6, disposed within IMEM 400 is ROM (read only memory) 401. ROM 401 is local to DM 2001 and not shared with SDRAM 302. ROM 401 is very inexpensive to include in DM 2001 and ROM is known to be very fast in comparison to RAM. For example, if it is predetermined that within, e.g., an operating kernel, I/O functions, utility libraries, or other software infrastructure instructions that are standardized for the system which are typically used very frequently, such that they may be considered a constant, and it is previously known which parts are of those instructions are static and which parts are dynamic, then you dispose them within ROM 401 of IMEM 400. By relocating them from the customary SDRAM 302 to ROM 401, this enables a system trade off, such that while the amount of memory space within SDRAM 302 that is gained is relatively small in comparison to the total memory size, the time needed for those instructions to completed is dramatically reduced. In one example of this flexible scheme, a video has a picture that is constantly changing. While the picture changes, the instructions relating to the process of displaying the pictures does not. Therefore, by relocating those instructions to ROM 401, that portion of the video process is removed from the system resources, and is directly accessible through the I/O space (bus) 304, thereby increasing the speed with which the system can process those instructions.

Still referring to FIG. 6, disposed within IMEM 400 is RAM (random access memory) 402. RAM 402 is local to DM 2001 and not shared with SDRAM 302. Additionally, RAM 402 is very inexpensive to include in DM 2001. RAM 402 is very efficient and specialized and, in this implementation, is configured as a type of self modifying code, in one embodiment of the present invention. For example, a small function of a module is preloaded into RAM 402. This small function has a particular behavioral pattern, such that it has certain tendencies relative to the module. By prefetching and loading the small loaded function, and as long as the module related to the function is being processed, that small portion continues to remain active. In this example, the small portion is relative to one type of a stream. As such, having the small portion preloaded in RAM 402, and as long as the system is processing that stream, the system uses that small function, so as to decrease the time required to process the module. When the module changes to a subsequent module, a subsequent small portion of that subsequent module is preloaded into RAM 402, in one embodiment of the present invention.

For example, if a module containing an audio signal was being processed, there is a small portion of that module that will facilitate the audio processing. Now a subsequent module, in this instance, a video signal is being processed, then the small portion would change to affect the video processing. Because there is a predictability of what is being processed, this change is done under the main processing control.

Still referencing FIG. 6, in another example, the system is processing a module, and the module is an audio codecs such as, e.g., a Dolby AC-3, an MP3 signal, or a DTS codec. The system may have ten different types of audio chips to support, of which some parts are common and other parts are specific to each separate type of protocol. In this example, when the system processes a different audio signal, a different small portion, relative to the different audio signal is loaded into RAM 402, in one embodiment of the present invention.

It should be appreciated that the functions of ROM 401 and RAM 402 are complimentary with each other. As such, in this embodiment, once a user has determined the requirements of the core, the user can associate the right size of RAM and ROM, such that the performance of the system is optimized. It should be further appreciated that for ASICs (application specific integrated circuits), DM 2001 is vendor programmed, such that it is configured to perform user specified tasks or processes particular to that user. described in FIG. 4, in one embodiment of the present invention. ICB 405 is, in one embodiment of the present invention, configured as a prefetch mechanism which provides fast access to streaming data that is controlled by other hardware mechanisms or other CPUs. Typically, the streaming data is comprised of different bit streams that are used for the applications disposed within system 299, and the streaming data can be of many different formats, such as, e.g., video or audio bit streams. ICB 405 is provided because, especially in an embedded system, of the processing of many different types of data. In an embedded system, the system is processing numerous different types of data. In some of the cores, the system has had to process streaming data, and typically cache 301 is relatively useless for streaming data. This is because in streaming data there is a core, a piece of hardware, that is processing the bit stream in and another core that is processing the bit stream out. For example, one piece of data is being produced in a streaming manner by one core and is being processed by another core, such that the piece of data is buffered into memory and then processed.

Figure 7:
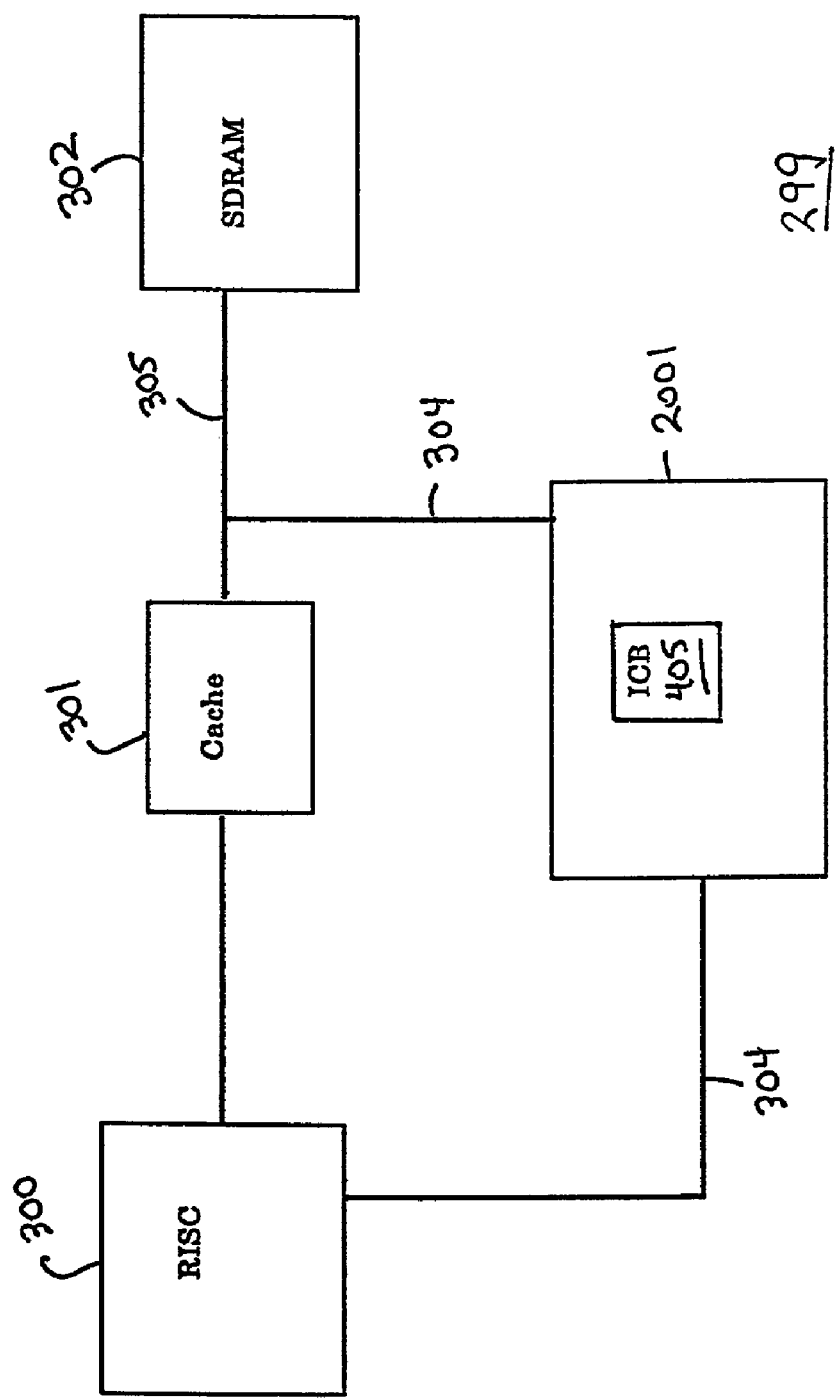
FIG. 7 is a block diagram illustration of the description and operation of the ICB (incoming buffer) unit, one component of the multifunction I/O organizer apparatus of FIG. 4, in accordance with one embodiment of the present invention.

Still referencing FIG. 7, in this kind of processing of streaming data, cache 310 is a problem. Because the data is streaming, such that the data is processed once and then discarded, and then another piece of the data stream is processed, cache which is associated with frequently used information, is relatively useless to process streaming data because the data is continually changing. Additionally, if you bypass cache 301 altogether, the RISC processor will typically access the streaming data in small chunks such as, e.g., a single word or a half word load store. Bypassing the cache slows the system down, creating havoc within the system by requiring additional load store requests that utilize the main memory space (bus).

Still with reference to FIG. 7, ICB 405 provides a stream buffer for the RISC that can control, as to what the processor needs to complete. In one example of one embodiment of the present invention, ICB 405 unit may be implemented as a prefetch mechanism on the MPEG decoder chip to access to header information for the MPEG data. As such, ICB 405 enables the MPEG decoder chip to decode and the parse the header sooner, thereby increasing the speed with which the MPEG data is processed. In another example, ICB 405 unit may be implemented as a prefetch mechanism on the audio decoder chip to access header information for the audio data.

As such, ICB 405 enables the audio decoder chip to decode and parse the header sooner, thereby increasing the speed with which the audio data is processed.

Because embedded systems have a lot of event based processing, once those events are initiated, the system reacts to and processes them. For example, the system is processing a stream computation, and there is a related event that occurs before the computation may be completed, such that, in many circumstances, the system can be configured to predict, especially in stream processing, what it will be processing next, in a logical flow such as, e.g., after the first stream computation, a second stream computation is needed, and then a third stream computation, and etc. Therefore, a prefetch can be issued for the stream data related to this event which is a correlated event. At this junction, the prefetch is issued and because ICB 405 is preloaded with this data, the time to process the stream reduced, and because access to the ICB is through I/O space (bus) 304, additional unrelated processes may be performed through memory space (bus) 305.

It should be appreciated that even if the system in unable to prefetch in advance, in one embodiment of the present invention, ICB 405 is still useful because, in this instance you will take the penalty of prefetching here, but subsequent to the prefetching of a large block, so that the load store penalty is incurred only once, then the next bits of the big/large blocks is accessed much faster, which also decreases processing time.

Figure 8:
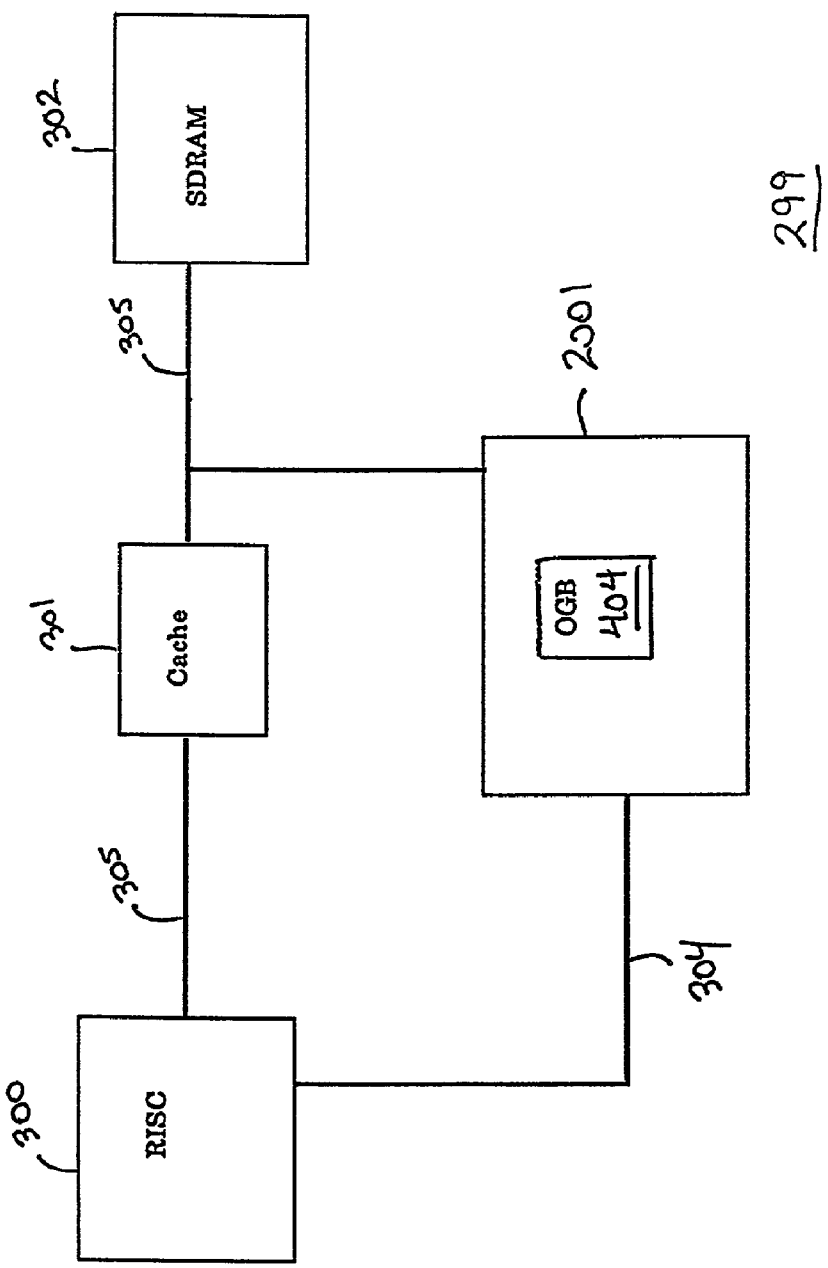
FIG. 8 is a block diagram illustration of the description and operation of the OGB (outgoing buffer) unit, one component of the multifunction I/O organizer apparatus of FIG. 4, in accordance with one embodiment of the present invention.

FIG. 8 shows the multimedia computer system 299 of FIG. 3. Shown disposed within DM 2001 is OGB (outgoing buffer) unit 404, as described in FIG. 4, in one embodiment of the present invention. OGB 404 is configured to enable system processor 300 to issue DMA commands and communicate with other units in the system, including memory 302. With this functional block, system processor 300 can send the message/command without being kept busy and it can also independently process other tasks without being disrupted. This scheme provides common interface for data accessed from/to all memories, processors and hardware modules.

Still with reference to FIG. 8, when system 299 requires the sending of data to another processor or core within system 299, OGB 404 is utilized such that other processes may continue while the data is being sent. It does not obstruct processor 300 from doing other tasks, so the core won't be halted by sending out messages or sending out data or tracking the DMA for the operation. Because the system is able to write and read, such that there are read and write requests upon the memory and system spaces (buses), OGB 404 is configured to query if it can send a message. Because there are a maximum number of messages that can be active within the whole system, OGB 404 won't allow additional messages until the number of active messages is such that another message won't put the number above the maximum. OGB 404 will check for status if it can send and when the system is available and the buffers are OK, then the message can be sent, to the thread queue buffer and finally to the target core or processor within system 299.

Still referring to FIG. 8, it should be appreciated that essentially this is a unifying scheme for a lot of different types of things. e.g., interprocessor messages, debug messages, DMA messages. In this architecture within system 299, system bus 305 is connected to memory 302, and most of the traffic that is on system bus 305 is going to memory, SDRAM 302. However, OGB 404 also provides a routeable path for other things. For example, instead of going to SDRAM 302, depending the address space, OGB 404 is being utilized not only as a system bus but also utilized for communication between cores, as a core message bus superimposed on the top of the main memory space (bus) 305 traffic, by sharing the memory bus for these kinds of inter-core communications, interprocessor messages, software core to software core message.

For example, in system 299, a debug message is to be sent. In this system having an on-chip embedded debug core, the debug message is to be sent to the debug core for processing. OGB 404 will retain the debug message while querying the system as to the number of active messages upon the system. When OGB 404 has determined that the number of active messages is below the maximum, the debug message may be sent, such that is does not place the number of active messages above the maximum.

In another example, if a user desires to program a DMA, the user simply wants to do just that and then initiate something else. A DMA command is essentially a message between cores. And the cores can be software cores, where it is more of a traditional interprocessor communication, or it can be from a software core to a slave hardware core which is DMA messaging. Since these messages/commands are being superimposed on top of the system bus, there is competition for a slot on that bus, because many of these messages that are generated by processor cores. OGB 404 enables RISC 300 to send these messages/commands on the system bus, such that once you have sent the message, the system is enabled to complete the remaining part of the processing. When the system is sending messages/commands, it is desirable to do just that without RISC 300 waiting on the system bus 305. OGB 404 enables RISC 300 to generate these messages/commands because they are on the control bus. Concurrently, RISC 300 uses the control bus to program OGB 404 to construct these messages/commands, and construct in software fully everything about the message, including the header, and the data portion of it, and RISC 300 has OGB 404 to buffer the messages/commands such that system 299 is enabled to continue processing of other tasks. RISC 300 has a simple flow controller in the software, although most of the control is done in hardware, and then utilizes OGB 404 to continually buffer outgoing messages until such time as when system bus 305 is below the maximum number of allowable active messages.

It should be appreciated that the combination of the components of DM 2001, a multifunction I/O organizer unit solve the data and communication patterns in a system on a chip by using software cores. When the these components; DMEM, IMEM, ICB, and OGB are combined, including messaging, into DM 2001, it enables system 299 to have a more predictable performance. Additionally, in the terms of access, the invention insures it. In terms of messaging, the invention allows the processor (not to wait) to complete some task, so this way system 299 is enabled to react to the events in the system easily. Because this is multimedia, everything is interrupt based, preconceived, such that the processing of the multimedia is very crucial to the speed with which system 299 may operate. Further, the expense of those events and interrupts is also very crucial, relative to time and processor involvement.

These are all different schemes for dealing with different types of data, and by organizing them into DM 2001 as a functional unit, this assists in implementation time, enabling the merging and organizing all the buffers into more of an implementation specific process having one large memory which is much smaller in physical substrate, thereby also providing a substantial cost benefit to the user.

While ICB 405 and OGB 404 allow the transfer of data into and out of DM 2001, respectively, DMEM 403 can store temporary data, message queues/command information. Since all the processors operate through a common bus, they can issue non-blocking messages to each other as well as memory accesses and DMA commands. Therefore DMEM, ICB, and OGB together enable the associated processor to send/receive messages to other processors in the system, to program DMA commands, and to issue non-blocking stores to the memory.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A data and communication apparatus communicatively coupled with a multi-processor shared memory multimedia chip system for providing interprocessor communication while enhancing performance of each processor integral with said multi-processor shared memory multimedia chip system, said data and communication apparatus comprising:
   a data memory to retrievably store data;
   an instruction memory coupled with said data memory to retrievably store instructions;
   an incoming buffer coupled with said data memory and said instruction memory which permits transfer of data into said data and communication apparatus, said incoming buffer further adapted to provide fast access to streaming data and perform prefetch operations;
   an outgoing buffer coupled with said data memory and said instruction memory which monitors and permits transfer of data out of said data and communication apparatus, said outgoing buffer enables said each processor to communicate with other processors disposed within said system; and
   multiple registers coupled with said data and communication apparatus, said registers adapted to provide enhanced configurability and control of said data memory and said instruction memory, said registers further adapted to provide addressable memory storage locations for said retrievably stored data and said retrievable stored instructions, said registers separate from and in addition to the registers within said multi-processor shared memory multimedia chip system.

2. The data and communication apparatus of claim 1 wherein said data and communication apparatus is coupled with said multi-processor shared memory multimedia chip system, wherein access to said data and communication apparatus is via an I/O space, said I/O space separate from a memory space of said system, said I/O space pre-existent within said system.

3. The data and communication apparatus of claim 1 wherein said data said retrievably stored in said data memory is an interrupt service routine, wherein access to retrieve said interrupt service routine is via said I/O space, such that traffic on said memory space is commensurately reduced, so as to ensure the time required to complete said interrupt service routine.

4. The data and communication apparatus of claim 1 wherein said data retrievably stored in said data memory unit is real-time kernel thread context data, wherein said access to retrieve said real-time kernel thread context data is via said I/O space, such that traffic on said memory space in commensurately reduced, so as to increase speed with which thread context switching is achieved.

5. The data and communication apparatus of claim 1 wherein said instructions said retrievably stored in said instruction memory are a function of a particular process, said function having certain tendencies relative to said particular process, wherein after said particular process is completed, said function of said particular process is removed, such that a subsequent function of a subsequent process is then stored in said instruction memory unit.

6. The data and communication apparatus of claim 1 wherein said incoming buffer is configured as a prefetch mechanism for a particular type of data, so as to enable acceleration of the rate of said incoming buffer's decoding and parsing of header information relative to said particular data type, such that the processing time of said particular type of data is reduced.

7. The data and communication apparatus of claim 1 wherein said outgoing buffer enables said a processor of said multi-processor multimedia chip system to send said communications to other processors disposed within said multi-processor multimedia chip system while independently processing other tasks, such that said processing of said other tasks is not disrupted.

8. The data and communication apparatus of claim 1 wherein said outgoing buffer monitors the number of active communications within said system, such that a maximum number of active communications is not exceeded, so as to allow additional active communications to be placed within said system when said allowance will not exceed said maximum number.

9. A multi-processor shared memory multimedia chip system having a data and communication apparatus coupled with said multi-processor shared memory multimedia chip system, said data and communication apparatus for providing interprocessor communication while enhancing the performance of each processor within said multi-processor shared memory multimedia chip system, said data and communication apparatus comprising:
   a data memory to retrievably store data;
   an instruction memory coupled with said data memory to retrievably store instructions;
   an incoming buffer coupled with said data memory and said instruction memory which permits transfer of data into said data and communication apparatus, said incoming buffer further adapted to provide fast access to streaming data and perform prefetch operations; and
   an outgoing buffer coupled with said data memory and said instruction memory which monitors and permits transfer of data out of said data and communication apparatus, said outgoing buffer enables a processor of said multi-processor multimedia chip system to communicate with other processors of said multi-processor shared memory multimedia chip system; and
   multiple registers coupled with said data and communication apparatus, said registers for providing enhanced configurability and control of said data memory and instruction memory, said registers separate from and in addition to the registers of said multi-processor shared memory multimedia chip system, said registers of said data and communication apparatus to provide addressable memory storage locations for said retrievably stored data and said retrievable stored instructions.

10. The multi-processor shared memory multimedia chip system of claim 9 wherein said data and communication apparatus is coupled with said system, wherein said data and communication apparatus is accessible via an I/O space, said I/O space pre-existent within said system, said I/O space separate from a memory space of said system.

11. The multi-processor shared memory multimedia chip system of claim 9 wherein said data retrievably stored in said data memory is an interrupt service routine (ISR), said interrupt service routine accessible via said I/O space so as to commensurately reduce traffic on said memory space, such that the time required to complete said ISR is ensured.

12. The multi-processor shared memory multimedia chip system of claim 9 wherein said data retrievably stored in said data memory is real-time kernel thread context data, said real-time kernel thread context data accessible via said I/O space so as to commensurately reduce traffic on said memory space, such that the time required to achieve real-time thread context switching is reduced.

13. The multi-processor shared memory multimedia chip system of claim 9 wherein said instructions said retrievably stored in said instruction memory are a function of a particular process, said function having certain tendencies relative to said particular process, wherein after said particular process is completed, said function of said particular process is deleted, such that a subsequent function of a subsequent particular process is stored in said instruction memory.

14. The multi-processor shared memory multimedia chip system of claim 9 wherein said incoming buffer is configured as a prefetch mechanism for a particular data type and enables acceleration of the rate of said incoming buffer's decoding and parsing of header information relative to said particular data type, such that the processing time of said particular data type is reduced.

15. The multi-processor shared memory multimedia chip system of claim 9 wherein said outgoing buffer enables a said processor of said multi-processor multimedia chip system to send said communications to other processors disposed within said system while simultaneously processing other tasks, such that said processing of other tasks is not disrupted.

16. The multi-processor shared memory multimedia chip system of claim 9 wherein said outgoing buffer monitors the number of active communications within said system, such that a maximum number of active communications is not exceeded, so as to allow additional active communications to be placed within said system when said allowance will not exceed said maximum number.

17. In a multi-processor shared memory multimedia chip system having a memory space and an I/O space, a method to provide interprocessor communication while enhancing processor performance, said method comprising:
providing a data and communication apparatus adapted to be communicatively coupled to said multi-processor shared memory multimedia chip system, wherein access to said data and communication apparatus is via said I/O space, said data and communication apparatus further adapted to enable said interprocessor communication and said enhanced processor performance;
providing a data memory to retrievably store data;
providing an instruction memory coupled with said data memory to retrievably store instructions;
providing an outgoing buffer coupled with said data memory and said instruction memory, said outgoing buffer enables a processor of said multi-processor shared memory multimedia chip system to communicate with other processors disposed within said system; and
providing multiple registers coupled with said data and communication apparatus, said registers adapted to provide enhanced configurability and control of said data memory and said instruction memory, said registers further adapted to provide addressable memory storage locations for said retrievably stored data and said retrievably stored instructions, said registers coupled with said data and communication apparatus separate from and in addition to the registers of said multi-processor shared memory multimedia chip system.

18. The method of claim 17 wherein said data retrievably stored in said data memory is an interrupt service routine, said interrupt service routine accessible via said I/O space, such that traffic on said memory space (bus) of said multi-processor shared memory multimedia chip system is commensurately reduced, so as to ensure the time required to complete said interrupt service routine.

19. The method of claim 17 wherein said data retrievably stored in said data memory is real-time kernel thread context (streaming) data, said real-time kernel thread context (streaming) data accessible via said I/O space, such that traffic on said memory space is commensurately reduced, so as to increase speed with which real-time thread context (streaming) data is switched.

20. The method of claim 17 wherein said instructions retrievably stored in said instruction memory are a function of a particular process, said function having certain tendencies relative to said particular process, wherein following completion of said particular process, said function is deleted, such that a subsequent function of a subsequent process is then stored in said instruction memory.

21. The method of claim 17, wherein said outgoing buffer is operable to simultaneously process other tasks during and without disruption from said interprocessor communication.

22. The method of claim 21 wherein said outgoing buffer monitors the number of active communications within said system, said system having a maximum number of active communications, so as to allow additional active communications to be placed within said system when said allowance will not exceed said maximum number.

23. The method of claim 17 further comprising providing an incoming buffer coupled with said data memory and said instruction memory, said incoming buffer adapted as a prefetch mechanism for a particular data type, so as to enable acceleration of the rate of said incoming buffer's decoding and parsing of header information relative to said particular data type, such that the processing time of said particular data type is reduced.

24. The data and communication apparatus of claim 1, wherein said data memory comprises a shared, addressable data memory.

* * * * *